US008581874B2

(12) United States Patent
Brand et al.

(10) Patent No.: US 8,581,874 B2
(45) Date of Patent: Nov. 12, 2013

(54) TOUCH SCREEN DEVICE AND METHODS THEREOF CONFIGURED FOR A PLURALITY OF RESOLUTIONS

(71) Applicant: Motorola Mobility LLC, Libertyville, IL (US)

(72) Inventors: Zachary L. Brand, Northbrook, IL (US); Tomohiro Ishikawa, Evanston, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/666,186

(22) Filed: Nov. 1, 2012

(65) Prior Publication Data

US 2013/0057498 A1    Mar. 7, 2013

Related U.S. Application Data

(62) Division of application No. 12/339,685, filed on Dec. 19, 2008, now Pat. No. 8,325,147.

(51) Int. Cl.
G06F 3/041    (2006.01)

(52) U.S. Cl.
USPC .......................................................... 345/173

(58) Field of Classification Search
None
See application file for complete search history.

(56) References Cited

U.S. PATENT DOCUMENTS

| 5,801,682 | A  | 9/1998  | Coni et al.     |
| 7,006,078 | B2 | 2/2006  | Kim             |
| 7,145,552 | B2 | 12/2006 | Hollingsworth   |
| 7,312,409 | B2 | 12/2007 | Lo et al.       |
| 2002/0093491 | A1 | 7/2002 | Gillespie et al. |
| 2005/0088416 | A1 | 4/2005 | Hollingsworth   |
| 2006/0256093 | A1 | 11/2006 | Furukawa et al. |
| 2007/0080956 | A1 | 4/2007 | Fann            |
| 2007/0229468 | A1 | 10/2007 | Peng et al.     |
| 2008/0309627 | A1 | 12/2008 | Hotelling et al. |
| 2008/0309631 | A1 | 12/2008 | Westerman et al. |
| 2009/0009195 | A1 | 1/2009 | Seguine         |
| 2009/0167713 | A1 | 7/2009 | Edwards         |

FOREIGN PATENT DOCUMENTS

| KR | 1020070035831 A | 4/2007 |
| WO | 9736225         | 10/1997 |
| WO | 2008062217 A2   | 5/2008 |

OTHER PUBLICATIONS

KIPO's Notice of Preliminary Rejection (English Translation), Jan. 22, 2013, all pages.
Supplementary European Search Report, Berlin, Mar. 13, 2013, all pages.

*Primary Examiner* — Jason Olson
(74) *Attorney, Agent, or Firm* — Gary J. Cunningham

(57) ABSTRACT

Disclosed is a touch screen and a method of touch screen having a first plurality of sensor segments coupled to first scan lines and a second plurality of sensor segments being subsections of one of the first plurality of sensor segments, the second plurality of sensor segments including second scan lines that are bundled by a multiplexer configured to aggregate output of the second plurality of sensor segments into a single transmission channel. The individual output of the multiplexed sensor segments subsections can be either combined into a single signal for processing during a normal scan, or their individual output can be processed individually for higher resolution. Using two scans, the first a normal scan, and the second a higher resolution scan, the disclosed touch screen and methods zoom in on the proximity of the touched area and scans with a higher resolution the proximity only where it is needed.

13 Claims, 5 Drawing Sheets

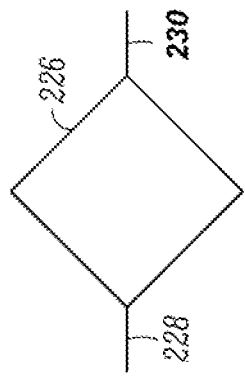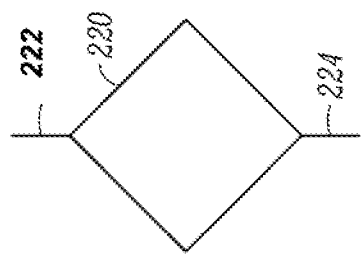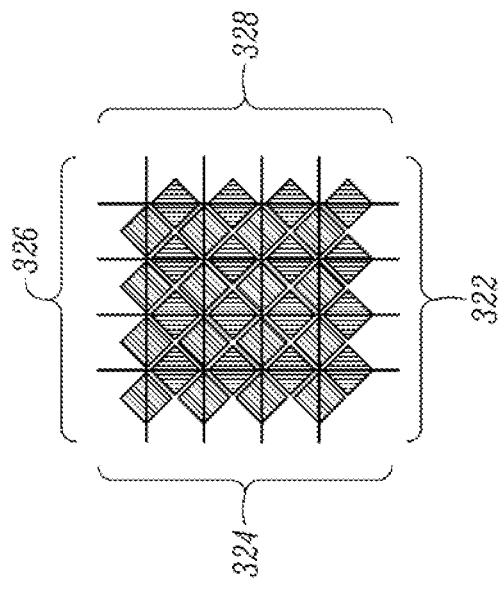

TOUCH SCREEN DEVICE AND METHODS THEREOF CONFIGURED FOR A PLURALITY OF RESOLUTIONS

FIELD

Disclosed is a touch screen and a method of touch screen having a first plurality of sensor segments coupled to first scan lines and a second plurality of sensor segments being subsections of one of the first plurality of sensor segments, the second plurality of sensor segments including second scan lines that are bundled by a multiplexer configured to aggregate output of the second plurality of sensor segments into a single transmission channel.

BACKGROUND

Many types of electronic devices incorporate touch screens, such as capacative and resistive touch screens. Touch screens are utilized to provide input in response to menus, and to receive content such as indicia formed by a user's finger trace, or a stylus. Capacitive touch screens are digital, their accuracy being dependent upon their resolution.

A capacitive touch screen utilizes sensor segments, each having a transparent electrode to sense touch. A sensor segment can have a diamond shape. A transparent electrode of the sensor segment is coupled to a scan line in the horizontal direction, and a scan line in the vertical direction. Typically, the scan lines are scanned at 60 Hertz (Hz) or higher frequency. The scan speed can be matched to follow a typical finger movement. Thus an entire touch screen can be scanned at such a scan rate in order trace the finger movement. If the scan rate were any faster, power efficiency and touch signal strength would be compromised with no added benefit.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 2A and 2B depict an embodiment of a single diamond shaped sensor segment;

FIG. 3 depicts an embodiment of subsections of a sensor segment as a four-by-four matrix of sensor segment subsections;

DETAILED DESCRIPTION

Increasing touch screen resolution can be accomplished by introducing more sensor segments. For example, two sensor segments could replace a single sensor segment. However, by introducing additional sensor segments and their respective transmission channels, the sensitivity of the touch screen would be reduced because the scan rate would remain the same, but the time available to scan each sensor segment would be divided in half reducing the signal strength and making it noise prone. Additionally, with twice the transmission channels, the complexity of the device would be substantially increased. It is preferable to keep the number of transmission channels used to a minimum.

Poor touch screen resolution is particularly problematic for handwriting recognition, especially with Chinese characters. As mentioned, a touch screen's accuracy is dependent upon its resolution, a typical sensor segment having the dimensions of 5 to 8 in periodicity and 25 to 70 millimeters squared ($mm^2$). With such a resolution, were a user to draw, for example, a line diagonally across a touch screen, a straight diagonal line would be recognized as a bumpy line.

Figure 1:
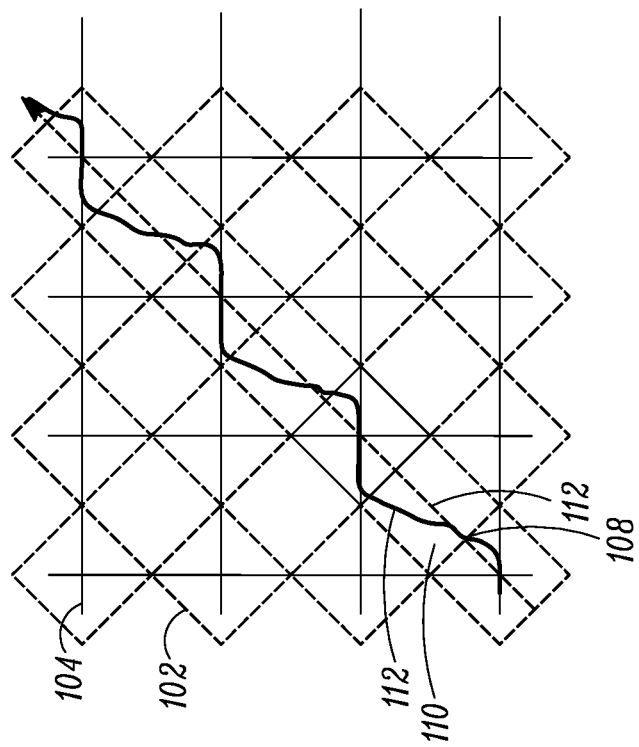
FIG. 1 illustrates how a straight diagonal line is recognized by a touch screen device with typical resolution.

FIG. 1 illustrates how a straight diagonal line is recognized by a touch screen device 100 with typical resolution. A plurality of diamond shaped sensor segments 102 may be scanned by the sensor grid 104. The dotted line 112 represents an actual finger path, diagonal across the touch screen device 100. When the user touches at the edge of a, for example, sensor segment 110, but not overlapping any other sensor segment, the controller (shown below) has no way of determining that the touch occurred anywhere other than the center of the sensor segment 110. The bumpy line 108 represents the sensed finger path. As mentioned, handwriting recognition applications could find such a bumpy line 108 difficult or impossible to interpret.

Disclosed is a touch screen and a method of touch screen having a first plurality of sensor segments coupled to first scan lines (transmission channels) and a second plurality of sensor segments being subsections of one of the first plurality of sensor segments, the second plurality of sensor segments including second scan lines that are bundled by a multiplexer configured to aggregate output of the second plurality of sensor segments into a single transmission channel. In this way, a plurality of sensor segments subsections may replace a sensor segment having traditional dimensions. The replacement sensor segments subsections have scan lines that are multiplexed so that their individual output can be either combined into a single signal for processing during a normal scan, or their individual output can be processed individually as will be discussed below. So in a way, the disclosed touch screen device is configured with at least two resolutions. The disclosed touch screen has both a traditional resolution, and a higher resolution.

The scanning process can be broken down into two processes. A disclosed method includes first scanning scan lines (transmission channels) of a plurality of multiplexers, each of which combine the signals of a plurality of multiplexed sensor segments during a normal scan to determine the proximity of input to the touch screen. That is, the first scan can deliver output to the controller to determine if a touch has occurred and its proximity with traditional resolution. When the proximity of touch input is detected, a second scan is processed within the proximity of the detected touch, but this time, the individual signals of the sensor segment subsections are not combined to form a single output, they are instead individually processed, providing a scan of higher resolution.

To increase the resolution in accordance with the disclosed touch screen and methods thereof, in one embodiment, a traditional sensor segment may be divided into sixteen subsections, forming a four-by-four matrix, having four channels in the horizontal direction and four channels in the vertical direction. The first scan may only detect that touch has occurred somewhere within the four-by-four matrix of sensor segment subsections. In the second scan, the sensor segment subsections of the four-by-four matrix of are individually processed to determine which of the subsections received the touch input. The effect of the second scan can be characterized as selectively increasing the resolution of the overall touch screen. Put another way, using two scans, the first a normal scan, and the second a higher resolution scan, the disclosed touch screen and methods zoom in on the touched area and scans with a higher resolution only where it is needed. In such an embodiment, the time it takes to scan at the disclosed higher resolution is only twice as long, whereas adding normal scan channels, for example, twenty-four normal scan channels could impact the scan rate at least that much. Beneficially, many disadvantages of increasing the resolution may be avoided by the disclosed touch screen and disclosed methods.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims. It is understood that the use of relational terms, if any, such as first and second, up and down, and the like are used solely to distinguish one from another entity or action without necessarily requiring or implying any actual such relationship or order between such entities or actions.

At least some inventive functionality and inventive principles may be implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIGS. 2A and 2B depicts an embodiment of a single diamond shaped sensor segment. A transparent electrode of the sensor segment 220 is coupled to a scan lines (transmission channel) 222 and 224 in the vertical direction. Another transparent electrode of the sensor segment 226 is coupled to the scan lines (transmission channel) 228 and 230 in the horizontal direction. A sensor segment can be of any appropriate shape. A traditional sensor segment for a utility such as a touch screen of a mobile communication device has dimensions of 5~8 in millimeter in the periodicity. It is understood that any touch screen having sensor segments of any dimensions and/or shape in the disclosed configuration and that operates in the disclosed manner is within the scope of this discussion.

FIG. 3 depicts an embodiment of subsections of a sensor segment as a four-by-four matrix of sensor segment subsections. Depicted are sixteen subsections, four in the horizontal direction 326 and four in the vertical direction 328. As with the single sensor segment 220 and 226 (see FIG. 2), the sixteen subsections are coupled to scan lines, 222 and 224, in the horizontal direction and to scan lines 228 and 230 in the vertical direction. It is understood that any number of subsections are within the scope of this discussion. For example, were there one hundred subsections, the resolution may enable writing recognition from input of a stylus well. More subsections can provide higher resolution. In an embodiment having sixteen subsections, the resolution can be improved sixteen fold. Moreover, as discussed below, sensor segment subsections within sensor segment subsections, multiplexed in layers, may provide varying degrees of resolution, which may be beneficial for certain applications.

Figure 4:
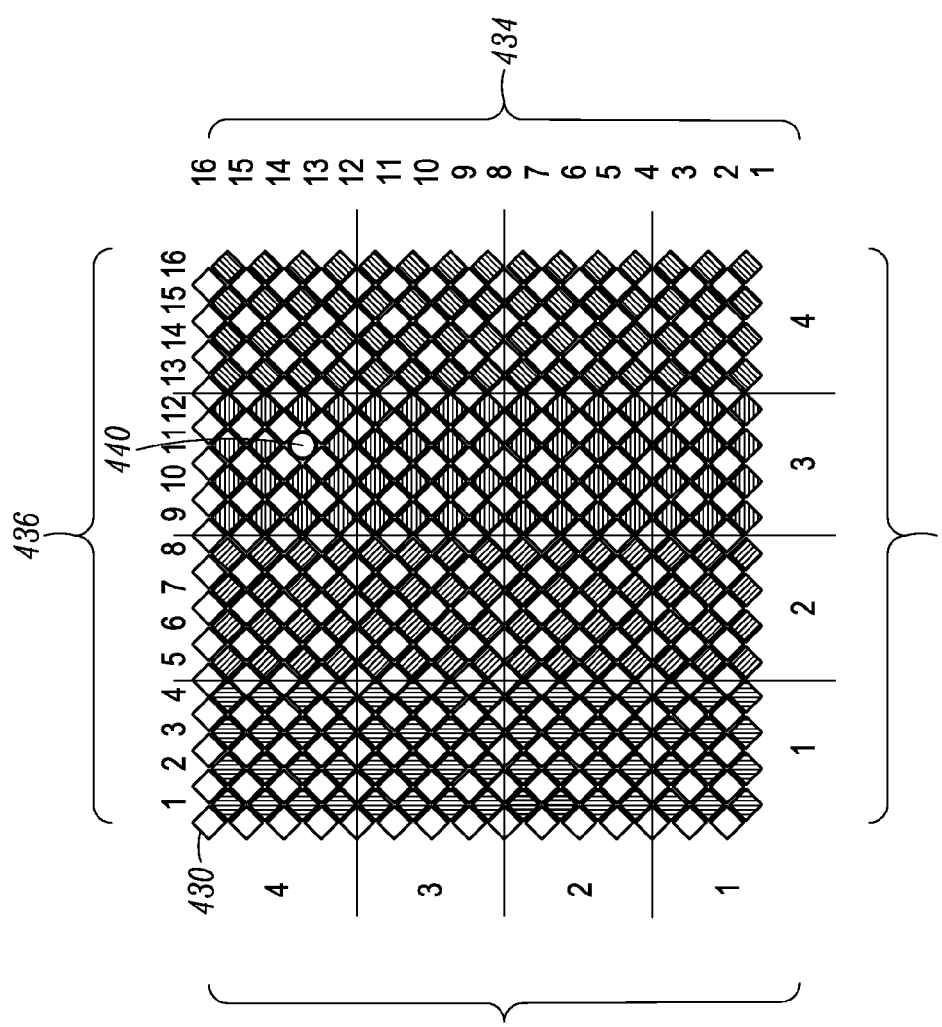
FIG. 4 depicts an embodiment of a touch screen that includes sixteen traditional sensor segments, identified by a vertical gridlines collectively illustrated demarking columns 1-4, and a horizontal gridlines collectively illustrated demarking rows 1-4.

FIG. 4 depicts an embodiment of a touch screen 430 that includes sixteen traditional sensor segments, identified by a vertical gridlines 432 collectively illustrated demarking columns 1-4, and a horizontal gridlines 434 collectively illustrated demarking rows 1-4. Each of the row or column is numerically identified by its position. For example, (1, 1) is at the lower most left hand corner of the touch screen, where the first number of (1, 1) represent the horizontal (row) FIG. 4 further depicts that the subsections of the sensor segments identified by a gridlines 436 collectively illustrated demarking rows 1-16 and a gridlines 438 collectively illustrated demarking columns 1-16. Of course, rows 1-16 have a finer resolution as rows 1-4 as do columns 1-16 have a finer resolution than columns 1-16. In traditional grid mode having a lower resolution, the detected touch 440 is at the (4, 3) intersection. The same touch can be resolved to (3, 2) of the subsections of the (4, 3) quadrant. In the higher resolution, the sensor segment subsection touch that is identified by grids 436 and 438, the final touch position is (11, 14).

Figure 5:
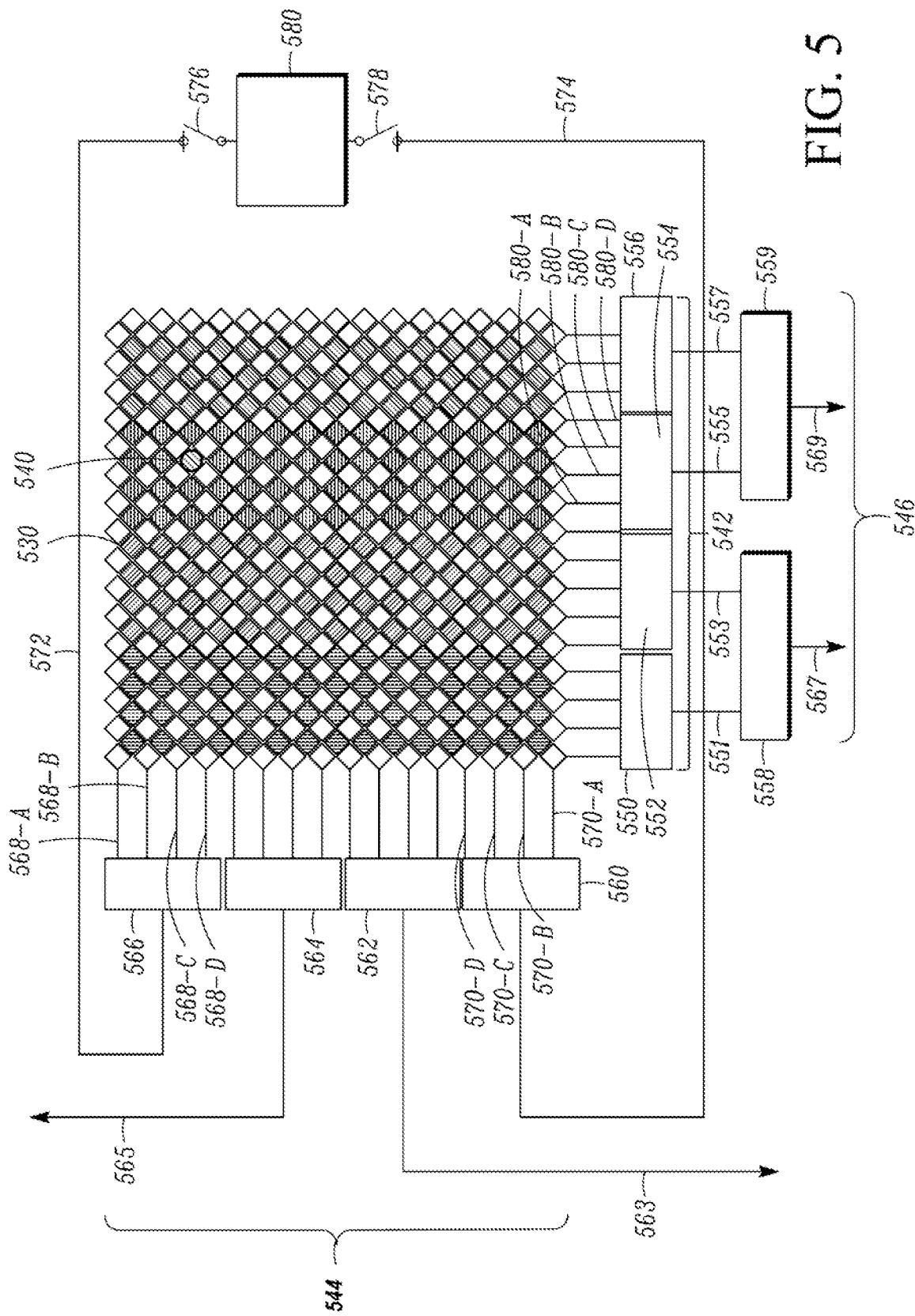
FIG. 5 depicts several different embodiments of a touch screen 530 and portions of circuit components.

FIG. 5 depicts several different embodiments of a touch screen 530 and portions of circuit components. Touch screen 530 is similar to touch screen 430 depicted in FIG. 4, that would include sixteen traditional sensor segments, each traditional sensor segment including a plurality of subsections, in the example of FIG. 5, sixteen subsections per traditional sensor segment form four-by-four matrices of sensor segment subsections. A detected touch 540 is similarly depicted in the (11, 14) position. As mentioned above, it is understood that any number of subsections is within the scope of this discussion.

In the embodiment illustrated by FIG. 5, touch screen 530 includes sixteen scan lines in the horizontal direction and sixteen scan lines in the vertical direction. A scan line from each of the sensor segment subsections is coupled to a multiplexer. That is, in the vertical direction four sensor segment subsection scan lines are coupled to each multiplexer 550, 552, 554 and 556. In the horizontal direction four scan lines are coupled to each multiplexer 560, 562, 564 and 566. The multiplexers 550, 552, 554 and 556 in the vertical direction 546 receive column signals. The multiplexers 560, 562, 564 and 566 in the horizontal direction 544 receive row signals.

As mentioned, touch screen 530 includes sixteen scan lines in the horizontal direction 544 grouped into groups of four scan lines so that their signals can be combined by a multiplexers 560, 562, 564 and 566. For simplicity of illustration, multiplexers 562 and 564 having scan (transmission channels or drive) lines 563 and 565 that include arrows to indicate their circuitry (not shown) coupling them to the controller 580. In more detail FIG. 5 shows that multiplexer 566 can receive four scan lines 568-A, 568-B, 568-C and 568-D that can detect touch 540 and the multiplexer 554 has scan lines 580-A, 580-B, 580-C and 580-D so that they can combine their signals for a single transmission (drive or scan) line 572 and 555, respectively. In one example, when touch is detected 540 at the lower resolution (4, 3) (see FIG. 4) by one of the subsections having one of the lines 568-A, 568-B, 568-C and 568-D combined by multiplexer 566 and the lines 580-A, 580-B, 580-C and 580-D combined by multiplexer 554, the switch 576 in communication with line 572 and corresponding switch for the multiplexer 555 (not shown) and the controller 580 is closed. Also illustrated in detail is that multiplexer 560 receives scan lines 570-A, 570-B, 570-C and 570-D so that their signals can be combined for a single transmission channel 574. The switch 578 is depicted as open as no touch input is depicted in that region of the touch screen 530.

As discussed above, the scanning process can be broken down into two or more processes. A disclosed method includes first scanning scan lines of the plurality of sensor segments in both the horizontal direction 544 and in the vertical direction 542 to determine input 540 to the touch screen 530 at a particular sensor segment (4, 3). Since the scan lines of the sixteen four-by-four matrices of sensor segment subsections are multiplexed, their individual signals of some or all of the four-by-four matrices are combined to form a single output, so the first scan across the entire touch screen is a normal scan. In the depicted touch screen of FIG. 5, the lower resolution scan would involve four row scans and four column scans.

The second part of the process is scanning the scan lines 568-A, 568-B, 568-C and 568-D for vertical position and 580-A, 580-B, 580-C and 580-D for horizontal position, individually when input to the touch screen is determined at the lower resolution (4, 3), and the switch 576 for multiplexer 566 and corresponding switch for multiplexer 555 (not shown) have been closed. That is, the first scan at the lower resolution can determine if a touch has occurred and its proximity, that is within the matrix at (4, 3) and the second scan can determine that its location is (11, 14) of the higher resolution. That is, when a touch is detected at a sensor segment (4, 3), a second scan is processed within a particular proximity to the detected touch, but this time, the individual signals of the sensor segment subsections are not combined to form a single transmission channel output, the signals of scan lines 568-A, 568-B, 568-C and 568-D for vertical position and 580-A, 580-B, 580-C and 580-D for horizontal position are individually processed to determine that the touch was at (11, 14). Put another way, using two scans, the first a normal scan, and the second a higher resolution scan, the disclosed touch screen and methods zoom in on the touched area (4, 3) and scans with a higher resolution only where it is needed, in this case, determining that the touch is at the (11, 14) position. Beneficially, many disadvantages of increasing the resolution may be avoided by the disclosed touch screen and disclosed methods.

Also shown in the embodiment illustrated by FIG. 5, touch screen 530 includes sixteen scan lines in the vertical direction 542 grouped into groups of scan lines so that their signals can be combined by a multiplexers 550, 552, 554 and 556, respectively. As mentioned above, varying levels of resolution may be provided by the same touch screen. Various levels of resolution by the same touch screen may be provided by further multiplexing the multiplexed scan lines. For example, the four output transmission channels 551, 553, 555 and 557 of multiplexers 550, 552, 554 and 556 may be input to multiplexers 558 and 559 having output lines (transmission channels) 567 and 569 in the vertical direction 546 that are truncated by arrows to indicate that their circuitry (not shown) is coupled to the controller 580. It is understood that any number of resolution levels is within the scope of this discussion. Moreover, particular portions of the touch screen may have different resolution capability that other portions of the touch screen. For example, the center of the touch screen may be capable of a higher resolution that the outer portions of the touch screen.

A process for determining which resolution is an appropriate resolution may be determined depending upon the application running, on for example, a mobile communication device. For one application, a lower resolution may be preferable so that the application runs as fast as possible. In another application, a higher resolution may be preferable so that a finger writing input recognition application can be effective. In another application, an even higher resolution may be desirable, for example, so that a stylus writing input recognition application can be effective. In one embodiment, there may be a plurality of different resolutions available on a touch screen. For example, three different resolutions may be available on a touch screen as demonstrated in FIG. 5 where output lines 551, 553, 555 and 557 of multiplexers 550, 552, 554 and 556 are further multiplexed by multiplexers 558 and 559. Where a traditional sensor segment is replaced by a plurality of sensor segment subsections, the sensor subsections can in turn be replaced by even finer subsections that operate in the manner that has been described above. It is understood that any number of scan lines can be multiplexed, and any number of multiplexing layers is within the scope of this discussion.

Figure 6:
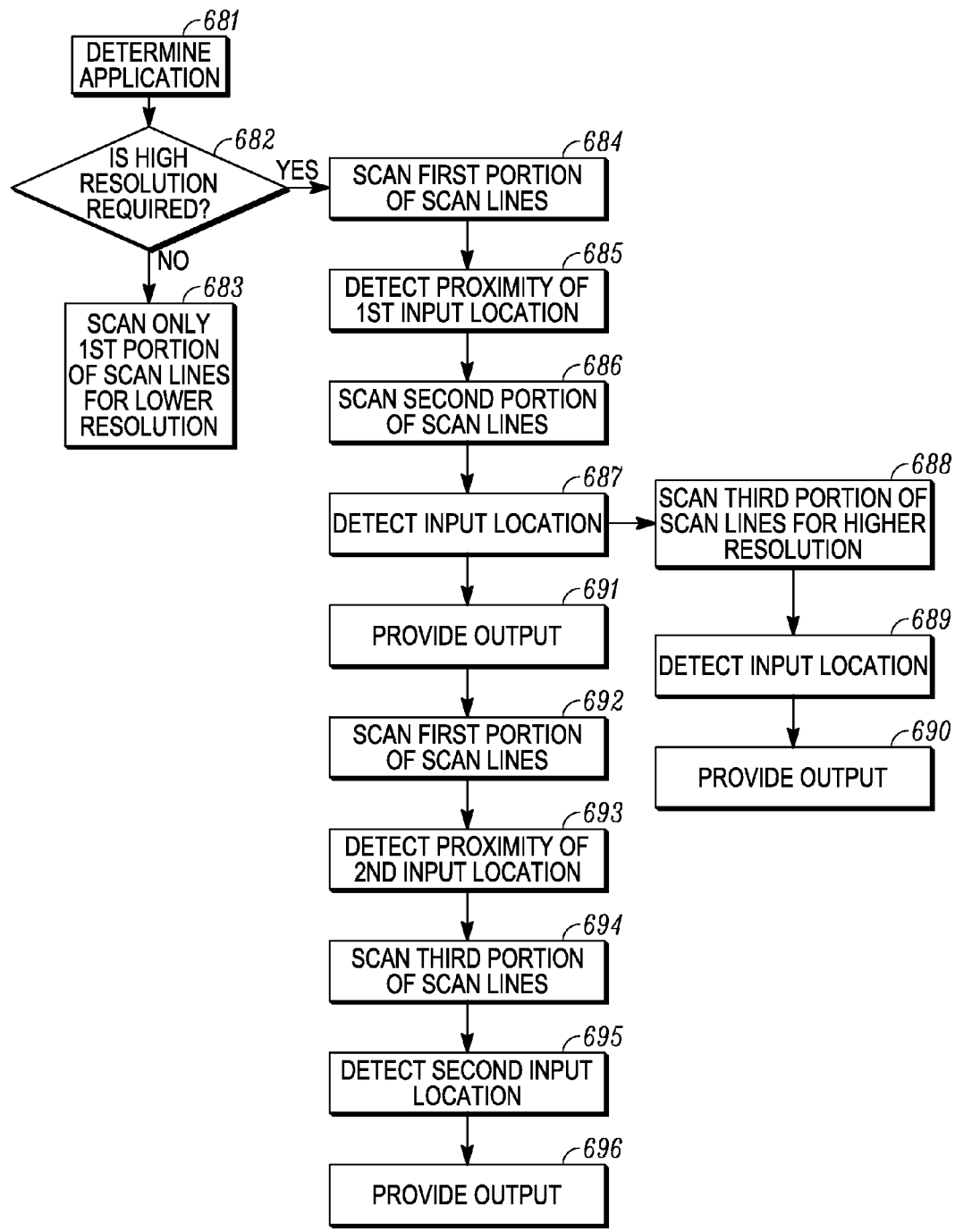
FIG. 6 is a flow chart illustrating a plurality of embodiments of methods of disclosed touch screens.

FIG. 6 is a flow chart illustrating a plurality of embodiments of methods of disclosed touch screens. An electronic device such a mobile communication device may have many different application stored in its memory or in another location. Certain applications may involve handwriting recognition. As mentioned, varying degrees of resolution may be desirable depending upon the application. In one embodiment of a method of the disclosed touch screen, an electronic device may determine 681 the application to be run and determine 682 the preferred resolution. If a lower resolution is preferable, then a normal scan can include scanning 683 only the first portion of the scan lines that form the transmission channels to the controller 580 (see FIG. 5).

In the event that a higher resolution is desirable, then a normal scan can occur where the first portion of the scan lines are scanned 684, that is, those receiving the multiplexed signals of a plurality of sensor segment subsections (see FIG. 5). The proximity of a touch may be determined 685 within the area of, for example, a four-by-four matrix of sensor segment subsections. A second scan may take place 687 to determine more precisely where within the four-by-four matrix of sensor segment subsections the touch occurred. Using two scans, the first a normal scan, and the second a higher resolution scan, the disclosed touch screen and methods zoom in on the touched area and scans with a higher resolution only where it is needed. In the event that touch screen has even finer resolution available, in that the subsections depicted in FIG. 5 have subsections, another scan 688 including a third portion of scan lines for higher resolution may provide 689 a more precise location of the detected touch. Output, such as indicia on the touch screen may be provided 690, for example to a handwriting recognition application.

In any event, output may be provided 691. The process may repeat itself, scanning 692 the first portion of the scan lines, providing a normal scan as described above. The proximity of a touch may be determined 693 within the area of, for example, a different four-by-four matrix of sensor segment subsections than previously described. A third scan may take place 694 to determine more precisely where within the different four-by-four matrix of sensor segment subsections the touch occurred. Again, using two scans, the first a normal scan, and the second a higher resolution scan, the disclosed touch screen and methods zoom in on the touched area to determine 695 the second input location, scanning with a higher resolution only where it is needed. Appropriate output may be provided 696.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method of a touch screen having a first plurality of segments having scan lines, and a second plurality of segments having scan lines, wherein the second plurality of segments are subsections of the first plurality of segments, comprising:
   providing a first plurality of sensor segments having scan lines in a horizontal and vertical direction;
   scanning a first portion of the scan lines to determine input to the touch screen at a detected input location, defining a low resolution scan; and
   scanning a second portion of the scan lines proximal to the detected input location, defining a high resolution scan,
   wherein scanning only the first portion of the scan lines in a low resolution mode and scanning only the second portion of the scan lines in a high resolution mode.

2. A method of claim 1 further comprising:
   displaying output on the touch screen proximal to the detected input location.

3. The method of claim 1, wherein
   scanning the first portion of the scan lines to determine input to the touch screen at a second detected input location; and
   scanning a third portion of the scan lines proximal to the second detected input location.

4. The method of claim 1 wherein the touch screen is incorporated in a device configured to execute applications, the method further comprising:
   determining the application of the device; and
   scanning only the first portion of the scan lines depending on the application.

5. A method for a touch screen having a first plurality of segments having first scan lines and a second plurality of segments having second scan lines, the method comprising:
   providing an application including a low resolution mode and a high resolution mode;
   scanning first scan lines of a first plurality of sensor segments to determine input to the touch screen at a particular sensor segment in the low resolution mode; and
   scanning second scan lines of a second plurality of sensor segments when input to the touch screen is determined in the high resolution mode.

6. A method of claim 5 further comprising:
   displaying output on the touch screen proximal a location where input to the touch screen has been determined.

7. The method of claim 5 wherein the second plurality of segments are subsections of the first plurality of segments.

8. The method of claim 5, wherein the provided application includes an intermediate resolution mode.

9. The method of claim 5 wherein the touch screen is incorporated in a device configured to execute applications configured for minimizing power drain.

10. The method of claim 5 wherein the touch screen includes the second plurality of sensor segments being subsections of one of the first plurality of first sensor segments.

11. The method of claim 5 wherein the touch screen includes the second scan lines being bundled by a multiplexer.

12. The method of claim 5 further comprising controlling scanning operations with a controller.

13. The method of claim 5 wherein the touch screen is a display device of a mobile communication device.

* * * * *